United States Patent [19]
MacAusland et al.

[11] Patent Number: 6,058,973
[45] Date of Patent: May 9, 2000

[54] SPOUT CONTROLLED MIXING VALVE MECHANISM

[76] Inventors: Samuel S. MacAusland, 58A Colburn Rd., Wellesley, Mass. 02181; Behzad Malekan, 360 Westo St., Waltham, Mass. 02154

[21] Appl. No.: 09/127,113

[22] Filed: Aug. 1, 1998

[51] Int. Cl.$^7$ .................................................. F16K 11/076
[52] U.S. Cl. .............................. 137/625.41; 137/616.7; 137/616.3
[58] Field of Search .................... 137/625.41, 625.4, 137/616.3, 616.7, 801

[56] References Cited

U.S. PATENT DOCUMENTS

| | | | |
|---|---|---|---|
| 2,707,486 | 5/1955 | Johns | 137/616.7 X |
| 2,790,632 | 4/1957 | Mellette | 137/801 X |
| 3,380,478 | 4/1968 | Garrison | 137/625.41 |
| 3,468,343 | 9/1969 | Siano | 137/636.2 |
| 3,765,455 | 10/1973 | Countryman | 137/616.7 X |
| 4,019,536 | 4/1977 | Dong et al. | 137/625.41 |
| 4,346,735 | 8/1982 | Raz | 137/801 X |
| 4,562,864 | 1/1986 | Yang | 137/625.41 X |
| 4,589,445 | 5/1986 | Sanchez Aguilar et al. | 137/616.7 |
| 4,768,557 | 9/1988 | Holzer | 137/616.3 X |
| 5,095,934 | 3/1992 | Iqbal | 137/625.41 X |
| 5,685,339 | 11/1997 | Lee | 137/625.41 |
| 5,832,958 | 11/1998 | Cheng | 137/625.41 |

FOREIGN PATENT DOCUMENTS 1353954  4/1963  France ........................... 137/616.7

*Primary Examiner*—John Rivell
*Assistant Examiner*—Meredith H Schoenfeld
*Attorney, Agent, or Firm*—Lambert & Assocaites, PLLC; Randolph P. Calhoune; Gary E. Lambert

[57] ABSTRACT

An improved valve mechanism requiring no handle for the direction and intermixing of two or more liquids. The device is extremely suitable for use in sinks such as are commonly found in the kitchen or bathroom. Control of water volume and temperature is accomplished by manipulating the spout itself which acts both as the water outlet and the controller. A swivel spray aerator fixture can be used to redirect the flow back toward the center of the sink or any other location. The device is adapted to be used with a sliding ceramic disc.

8 Claims, 5 Drawing Sheets

SECTION "3-3"

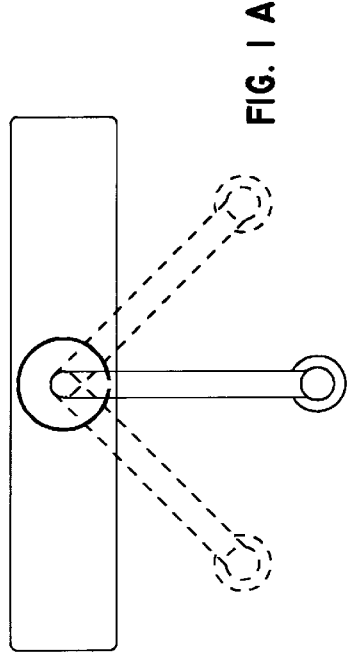
FIG. 1A
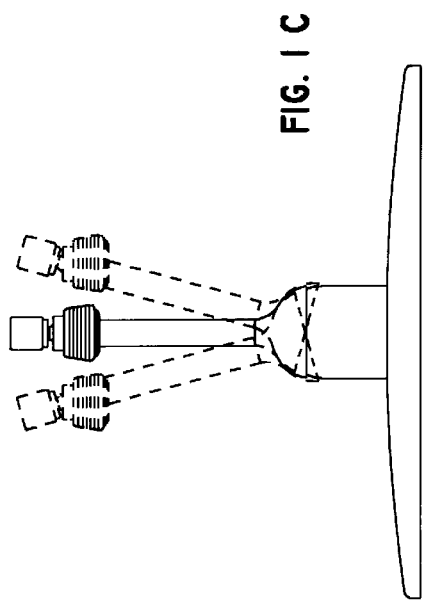
FIG. 1C
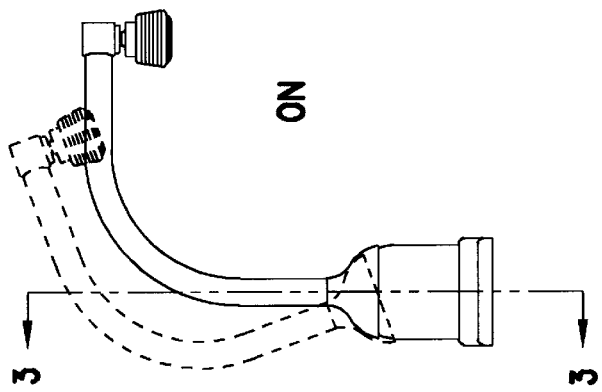
FIG. 1B
FIG. 1

SECTION "3-3"

SPOUT CONTROLLED MIXING VALVE MECHANISM

BACKGROUND OF THE INVENTION

The present invention relates to the field of valves, faucets or liquid dispensers. More particularly, it relates to an improved valve or faucet which enables mixing or blending of a plurality of separate streams of liquid as well as regulating the flow rate of the liquid stream from the device by the simple up, down, and side to side lateral movements of its liquid discharge spout. This device eliminates the need to operate knobs or handles for the regulation of flow rate or temperature. In the drawings and in the following description the invention is disclosed as embodied in a hot and cold water mixing faucet. It will be understood, however, that this embodiment is by way of ease of illustration rather than forming a limitation.

Faucets typically possess knobs or handles to regulate flow and temperature mix of the liquid delivered. One such handle or knob regulates cold water flow and the other regulates hot water flow, proportionally adjusting the two provides the desired temperature mix and flow from the spigot. Perhaps as common are faucets operated by a single lever. Typically these regulate flow rate by lifting the lever upwards, and regulate temperature mix by turning the lever laterally in one direction or the other. In both types, there is a requirement for some manner of valve or faucet which is separate from the spout.

Two prior art patents bear more similarity to this invention than the aforementioned types of faucets. However, the invention is considered to be novel and non-obvious in light of these patents thus qualifying for patent protection. The first, Sanchez Aguilar U.S. Pat. No. 4,589,445 describes a spout-operated valve wherein vertical rotation of the spout itself about a horizontal axis results in flow control of the valve. The valve contains passageways in the rotating member and the non-rotating member about which the rotating member rotates. Rotation of the rotating member progresses from non-alignment (and therefore no flow) through full alignment (full flow). The rotation of the one part to the other allows partial alignment of the passageways allowing the user to adjust the flow to the desired rate.

The other patent Siano U.S. Pat. No. 3,468,343 discloses a swinging spout faucet or valve that controls the admix of hot and cold sources. The volume is controlled by pivoting the spout about one end in a vertical plane and the temperature mix is controlled by pivoting the spout about the same end in a horizontal plane. Although the present invention's action of pivoting the spout at first appears identical to Siano, it is more reliable, less expensive, and less complicated valve mechanism than disclosed by Siano. Siano uses a complicated series of nested cylinders, which when appropriately raised or lowered, cause the desired flow to occur. In order to translate movement of the spout from a vertical plane to a horizontal plane, a linkage is utilized. One end of the linkage slidingly engages a cylindrical groove machined into one of the cylinders. As the spout is pivoted in the vertical plane, the end of the linkage engaged with the groove rides along the groove resulting in raising or lowering the cylinder appropriately. This action is identical to the action found in threaded rod, screws, or other linear-to-rotational translations relying on the use of an inclined plane. A number of problems are likely to occur with such a mechanism. One such problem is that the mechanism is likely to bind. Binding would occur because the control mechanism (the spout) contacts the temperature mixing mechanism at only a single point. That point is where the slotted plate engages the groove. Such a single point contact is typically insufficient to eliminate binding. Another problem is that the slotted plate could easily slip from the groove entirely. If this were to happen, a person could unwittingly use the device and have no immediate outward indication that the device was effectively broken. Admittedly, this would not be a serious problem unless the temperature mixing mechanism were to have slipped from the slotted plate during a 100% hot water condition and subsequently a child or elderly person unknowingly used the device, at which time they could be seriously scalded since there would be no indication that the device was broken. However such a device having once slipped, would be more apt to slip on a regular basis simply due to wear in the slotted plate or groove thereby rendering the faucet unusable.

Other problems sought to be overcome by the present invention which both Sanchez Aguilar and Siano have in common, is that manipulation of the spout through any plurality of positions causes by default a displacement of the liquid stream from some origin. In the case of a sink, the displacement of the water stream is toward a side wall of the sink rather than approximately aligned with the sink drain. Additionally, because each spout above is typically made of a heat conducting material, i.e., metal, and serves as the temperature control, any further manipulations of the spout require the user to contact the now heated spout surface. Furthermore, these devices do not protect the user from heat conducted through the metal spout when the user manipulates the spout to affect flow or temperature.

SUMMARY OF THE INVENTION

As such what is needed is a valve that regulates both volume and temperature by use of the valve spout. Such a valve would be safe to use, economical to manufacture, and lack the complexity associated with alternative prior art valves performing similar functions. The present invention comprises such a valve. It is further believed that this valve provides both a new and non-obvious resolution to the problems associated with prior art valve mechanisms and performs this function in a manner different than any other approach currently known. As such it is believed that this idea comprises a patentably distinct improvement over the prior art.

The device makes use of a sliding disc and seat subassembly which is controlled by manipulation of a valve spout to affect both flow of liquid and mixing. Flow is controlled by pivoting the spout about its attachment in a vertical or y-direction, whereas mixing is controlled by pivoting in a horizontal or x-direction. As noted above, the mechanism is very well suited for combining two liquids such as hot and cold water, however any two liquids could be combined in a similar manner. Furthermore the concept embodied in the device can easily accommodate more than two liquids and if desired could also be used to control the volume of a single liquid.

The device itself is reminiscent of a ceramic disc type valve mechanism in its function. However, unlike a ceramic disc type valve, the disc in the present mechanism can rotate upon its seat. This allows the spout to rotate without affecting the disc's position with respect to the seat. This configuration permits rotation of the spout yet allows the spout to be rigidly connected to the valve disc. The combination of the three movements, i.e., spout movement in the x-direction, y-direction, and a moment about the spout axis enables liquid temperature, volume, and direction to be regulated by the spout. Other combinations of these three movements have been contemplated as well. For instance, the moment or rotation about the spout axis could regulate temperature whereas moving the spout in the x-direction could be made to regulate direction. However the mechanism is configured, to enable further directional flexibility to the liquid stream, the apparatus can utilize a swiveling spray aerator fixture at the water discharge end of the spout. The swiveling spray aerator can be adjusted irrespective of the spout position. This adjustability enables a user to redirect the spray stream toward the center of the sink or toward whatever position the user desires. Additionally, it serves as a convenient location to grasp and thereby control the flow and temperature. By malting the swiveling spray aerator fixture of plastic or some other minimally heat conducting material, the user avoids scalding his or her hand on the spout itself.

It is therefore an object of this invention to provide an improved device which allows for both flow control and admixing of at least two separate streams of liquid by manipulation of the liquid discharge spout.

It is another object of the present invention to provide an improved mechanism to accomplish the above object, by utilizing a sliding disc and seat configuration as the controlling means.

It is another object of the present invention to provide a location which is essentially thermally non-conductive thereby enabling a user to grasp the spout which may be hot due to the passage of a hot liquid therethrough without risking a burn.

It is still another object of the present invention to provide a cost effective, economically produced device which is both mechanically reliable and eliminates the majority of problems associated with prior art valves of similar purposes.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawing.

FIGS. 1a, 1b, and 1c depict a preferred embodiment of a spout controlled mixing faucet with a swiveling spray aerator fixture, the phantom views illustrate the range of motion the spout can be moved in about its base;

DETAILED DESCRIPTION OF THE PREFERRED EMBODIMENT

With reference to FIGS. 1a, 1b and 1c, basic operation of a valve incorporating the desired features is depicted. The movement illustrated in FIG. 1a allows for redirecting fluid flow from the faucet, the movement illustrated in FIG. 1b, i.e., movement from forward to rearward (or in the y-direction) depicts volume control bounded by the on and off position of the faucet, and the movement depicted in FIG. 1c, i.e., movement from side to side (or in the x-direction) represents proportional changes to the fluid mixture. Of course the range of movement through which the faucet can move over each of the three directions depicted in FIGS. 1a, b, and c is smooth and continuous, i.e., there are infinite positions within any combination of any of the ranges.

Figure 2:
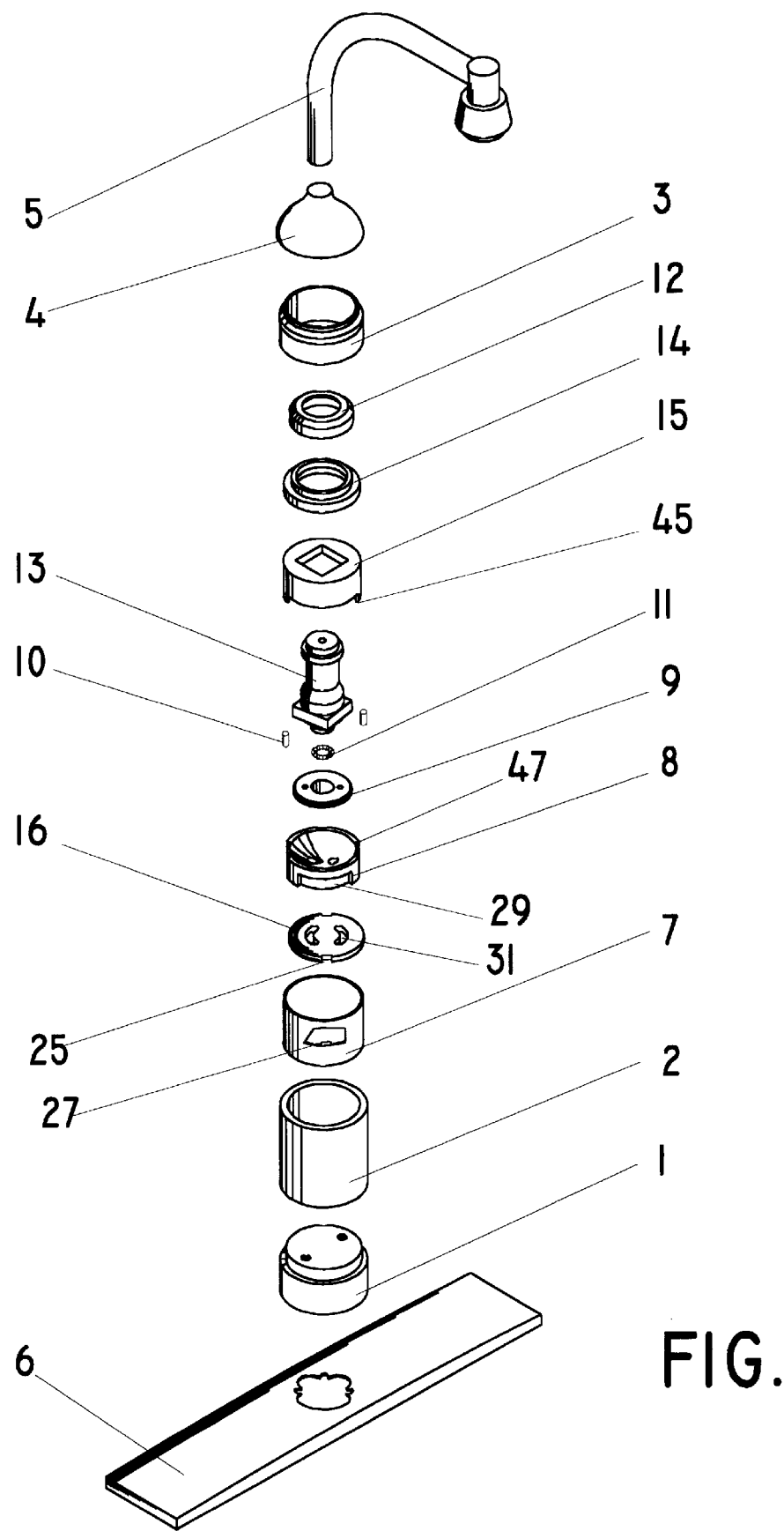
FIG. 2 depicts an exploded view of a preferred embodiment of the present invention as it would be assembled in the FIG. 1 spout.
Figure 3:
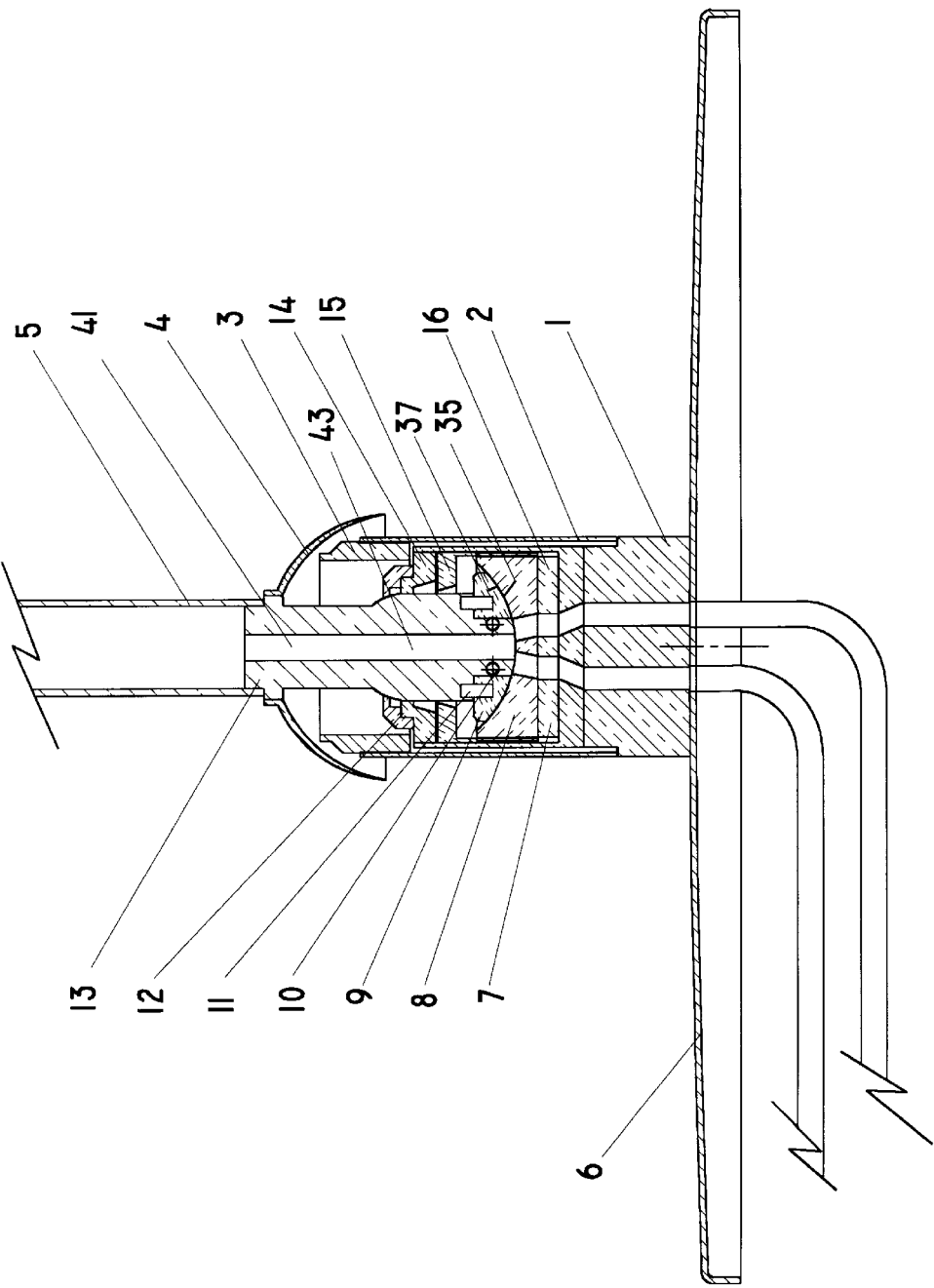
FIG. 3 is a sectional view of the FIG. 2 device as assembled.

Now with reference to FIGS. 2 and 3, one preferred embodiment showing the internal workings of the invention is depicted. A base 1 is provided for mounting on a faucet foundation support 6. A support seal 7 sits upon the base 1, but an alternative arrangement would allow the base I and support seal 7 to be incorporated into a single element. In essence the support seal 7 serves as a foundation for the internal working elements of the invention. Both the base 1 and the support seal 7 are provided with passages therethrough which are aligned and enable the unobstructed fluid flow through the valve mechanism itself. In the case of the preferred embodiment, there are two passages 33, one associated with a hot water source and one associated with a cold water source. Throughout the specification the term liquid and fluid is used interchangeably. Though the terms are generally analogous within this document, a valve mechanism in accordance with this invention could be adapted with suitable gaskets to operate with a non-liquid fluid. Understanding this, the FIGS. further depict an orifice plate 16 which seats within and is retained by the support seal 7. The orifice plate 16 is pinned or otherwise locked against inadvertent rotation with respect to the support seal 7 by the use of grooves 25 contained within the orifice plate 16 which engage corresponding tabs or keys depicted as item 27 on the support seal.

Figure 5:
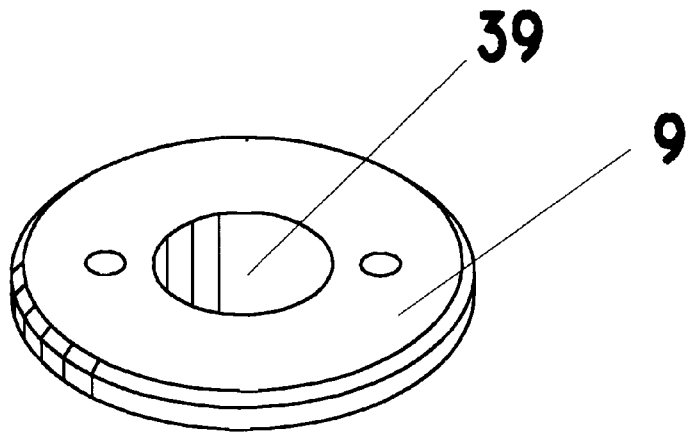
FIG. 5 depicts a preferred configuration of a valve disc for use in the FIG. 1 embodiment.
Figure 6:
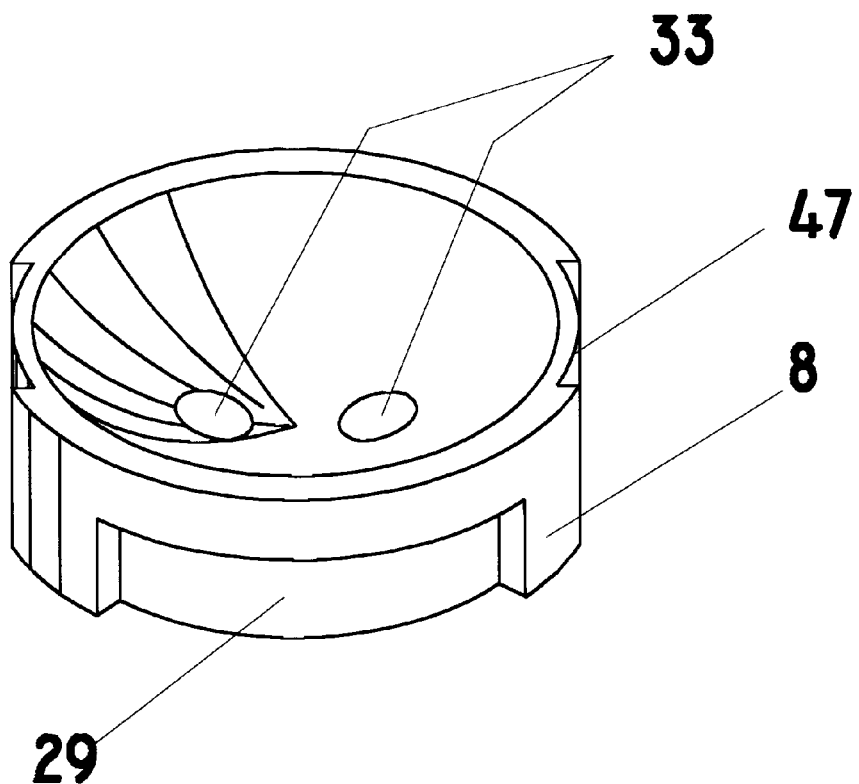
FIG. 6 depicts a preferred configuration of a valve seat for use in the FIG. 1 embodiment.

A valve seat 8 rests upon the upper surface of the orifice plate 16. Reliefs 29 are machined into the seat 8. These reliefs engage the keys 27 in a manner similar to the grooves 25 of the orifice plate. However, a significant difference is that the reliefs 29 allow for limited rotation of the seat 8 upon the upper surface of the orifice plate 16. As is also apparent from FIGS. 2 and 5, the orifice plate 7 contains two arcuate slots 31. These two slots align with the two passages 33 contained within the seat 8. Had there been more or less than two fluid sources, the number of passages 33 and the number of arcuate slots 31 would be identical to the number of passages for the specific valve embodiment. In any case, an upper surface of the reliefs 29 rides upon an upper surface of the keys 27. This configuration allows limited rotation of the seat 8 within the support seal 7. Due to the configuration of the arcuate slots 31, rotation of the seat 8 over its entire allowable range does not result in any blockage of the passages 33.

It should be understood that the configuration of the grooves 25, keys 27, and reliefs 29 form that embodiment considered to be the best mode. This configuration does not constitute the only design envisioned by the inventor which can provide a working version of this mechanism. For instance, not only could the base 1 be combined with the support seal 7 as stated above, but the support seal 7 could also be combined with the orifice plate 16. Furthermore, instead of keys 27, the support seal 7 could contain a groove within which a pin slides, the pin being a protrusion from the seat. The specific point being made is that there are a number of mechanisms available which enable the valve seat to rotate over some predetermined range without impacting or otherwise occluding flow path through the seat. These and other alternative embodiments performing this above function are considered to form a part of the invention as well.

In the preferred embodiment as shown in FIGS. 3 through 6, the seat 8 is provided with a concave surface 35 upon which a matching convex surface 37 rides. The convex surface 37 is formed by a bottommost portion of a disc 9. The disc 9 rotates, pivots, and slides over the mating surface formed in the seat 8. Again, though this forms the preferred configuration, the curvature of surfaces 35 and 37 can be reversed wherein the surface 37 of the disc 9 is concave, or even made coplanar wherein the surface 37 of the disc 9 is flat and the surface 35 of the seat 8 is flat. Although the disc 9 is able to move rotationally and slidingly with respect to the seat 8, no movement should be allowed in the vertical or z-direction which would serve to alter the distance between the two surfaces.

In order to accommodate liquid flow, a bore 39 is machined through the disc 9. A similarly machined bore 41 extends through the centerline of a valve stem 13. The valve stem 13 is rigidly pinned to an upper surface of the disc 9 by pins 10 such that the two bores 39 and 41 align one with respect to the other to form a mixing chamber 43. To prevent leakage between the interface of the disc 9 and the valve stem 13, an o-ring 11 could be provided. Elimination of this o-ring 11 as well as the pins 10 could be accomplished by combining the disc 9 and the valve stem 13 into a single element. However, it is believed that by providing each item individually, manufacturing costs can be reduced. The reason for this is that construction of the disc and seat are considered to be best served by a ceramic or ceramic composite material. There is no need to utilize this material throughout the valve assembly, as such suitable materials such as stainless steel, brass, bronze, or plastic can be used where appropriate. In order to eliminate the need for complex machining enabling the valve to comprise a number of subcomponents which are easily assembled is a recognized measure. However it cannot be overemphasized that this is not meant to form a limitation since as discussed above a number of substitutions in materials, configuration, and the combination of components is easily accommodated.

Either way, the mixing chamber 43 forms that portion of the valve mechanism within which the plurality of liquid streams are combined into a single substantially homogeneous liquid. Although once again, the preferred embodiment combines a hot water and a cold water stream, any number of streams could be combined in the same manner. Though mixing would not occur, a single stream could also be passed through the valve mechanism. As is evident in FIG. 4, movement of the disc 9 is controlled by manipulation of the valve stem 13. A valve stem housing 15 serves to envelop the valve stem 13 while still allowing an upper portion of the valve stem 13 to protrude therethrough. The interface between the valve stem 13 and the valve stem housing 15 is designed to rotationally couple the two components together. As shown in FIG. 2 specifically its configuration could be made square. The valve stem housing 15 is also provided with tabs 45 which correspond to recesses 47 within the seat 8. Other elements which serve to hold the valve mechanism together in working order are a gasket 14, a gland seal 12, a cap nut or bonnet portion 3, a sleeve 2 and a skirt 4. These components or similar items are found in most valves and as a result are easily understood. Insofar as any of these components have an impact on the functionality of the valve mechanism they will be discussed below.

Figure 4:
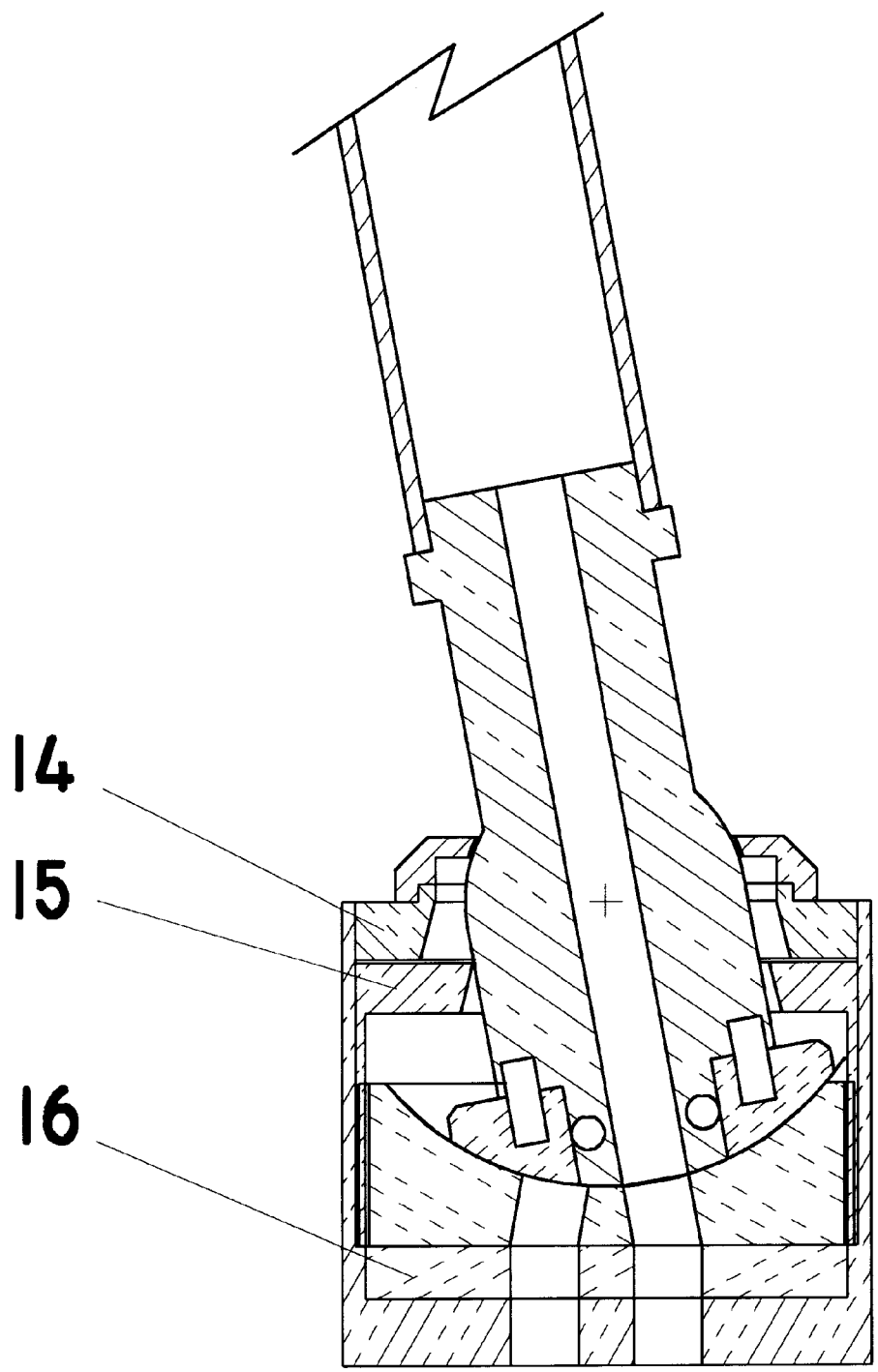
FIG. 4 is a sectional view similar to FIG. 3 showing the valve mechanism in a fully cocked position.

Operation of the valve mechanism is best understood by viewing the motions depicted in FIGS. 1b and 1c in conjunction with FIG. 4 in further view of the following explanation. Volume of the liquid out of the valve mechanism is controlled by grasping spout 5 and moving it forward and rearward, i.e., in the y-direction. Manipulation of the spout 5, which is attached to the upper end of the valve stem 13, causes the motion to be transferred through the valve stem to the disc 9. Movement of the disc 9 in this y-direction causes the bore 39 to move into or out of alignment with the passages 33 as the case may be. Movement of the disc 9 is limited by preventing the valve stem 13 from moving beyond a certain range. FIG. 4 shows the valve stem 13 as being limited by a side wall of the valve stem housing 15. As shown, an outer surface of the valve stem 13 impinges upon a suitably configured surface of the valve stem housing 15 thereby preventing any additional movement in that direction. Varying the proportion of the liquid sources, i.e., the hot and cold water is had by moving the disc 9 from side to side in the x-direction in a manner similar to that described above. A combination of these movements is of course possible thereby allowing flow and proportional changes to the liquids as would be expected in any mixing faucet.

Movement of the spout 5 itself could not be accomplished without affecting the liquid exiting the valve mechanism were it not for the ability of the spout to rotate without affecting the position of the disc 9 with respect to the seat 8. The unique design of the tabs, slots and recesses listed above provides a preferred means to accommodate this movement. More specifically, as the spout is swiveled about its axis in order to redirect flow within a suitable receptacle, the valve stem 13 which is rotationally coupled to the valve stem housing 15 can move until the tabs 45 seat against the sides of the slots 47 machined into the seat 8. Movement of the spout 5 continues since the seat 8 is also able to rotate through a fixed range. The reliefs 29 enable the seat to move until the side walls of these reliefs impact the keys 27 within support seal 7. By providing the interacting keys, slots, etc., the spout can be swiveled as desired to redirect fluid flow. Other methods of course exist which enable the spout to rotate the disc or even the disc and seat without affecting flow or admixture of the liquids. These too are considered part of the invention. For instance, if it is irrelevant that the spout can rotate 360 degrees about its attachement, then the keys, tabs, recesses are not necessary. Their existence simply makes a more user-friendly and thus preferred version.

If desired, the spout 5 can also be adapted to receive a swiveling spray aerator fixture 50 as depicted in FIGS. 1a, b, and c. Though the swiveling spray aerator fixture 50 is certainly not absolutely necessary, the combination of it and the spout 5 provide the ability to more accurately control the direction of the liquid to a target area. Another important advantage of the use of such a swiveling spray aerator fixture is that it provides a thermally non-conductive location for a user to grasp while manipulating the spout.

As such the method of making and using the device detailed above constitute the inventor's preferred embodiment and alternate embodiments to the invention. As pointed out throughout the specification, numerous configurations of the device as a whole or some of its constituent parts are available which would provide the desired results. While the invention has been described and illustrated with reference to specific embodiments, it is understood that these other embodiments may be resorted to without departing from the invention. Therefore the form of the invention set out above should be considered illustrative and not as limiting the scope of the following claims.

What is claimed is:

1. A valve mechanism comprising:

a seat having a first and a second surface and at least one passage between said first and second surfaces, said second surface of said seat in communication with at least one fluid supply, wherein each of said fluid supply(ies) are enabled to pass both separately and unobstructed from said second surface of said seat to said first surface of said seat through said passage(s);

a disc having a bore therethrough, said bore for receiving said fluid from said first surface of said seat; said disc is further slidably and rotatably in intimate communication with said first surface of said seat at a first surface of said disc; and a fluid outlet for receiving said fluid from said disc and discharging the same therefrom;

wherein rotational and lateral movement of said fluid outlet is translated to said disc;

wherein rotation of said fluid outlet about its base serves only to redirect fluid flow from said fluid outlet, and whereby lateral movement of said fluid outlet in any combination of an x-direction and a y-direction serves to affect volume and admixture of said fluid from said fluid outlet, said lateral movement ranging from alignment, through partial alignment, to occlusion of said bore with said at least one fluid supply.

2. The valve mechanism of claim 1 further comprising:

a valve stem mounted to said disc at a second surface, opposite said first surface, having a bore therethrough extending from said first surface to a second surface opposite said first surface, said valve stem having an upper and a lower portion wherein the bore of said valve stem is concentric with the bore of said disc;

a valve stem housing for receiving and retaining said lower portion of said valve stem therein and enabling said upper portion to extend from an upper portion of said housing, the upper portion of said valve stem housing serving as a pivotal fulcrum for said valve stem.

3. The valve mechanism of claim 1 further comprising:

an orifice plate upon which said seat rests, said orifice plate further comprising at least one arcuate slot therethrough, each of at least one arcuate slot aligning to one of said at least one fluid supply to enable unobstructed passage of said fluid therethrough;

a valve stem mounted to said disc at a second surface, opposite said first surface, having a bore therethrough extending from said first surface to a second surface opposite said first surface, said valve stem having an upper and a lower portion; and a valve stem housing for receiving and retaining said lower portion of said valve stem therein and enabling said upper portion to extend from an upper portion of said housing, the upper portion of said valve stem housing serving as a pivotal fulcrum for said valve stem;

wherein said seat is rotatable with respect to said orifice plate and said disc is rotatable and movable in said x- and y- direction with respect to said seat.

4. The valve mechanism of claim 3 wherein rotation of said valve stem housing and said seat together, enable said fluid outlet to direct fluid discharge therefrom into a receptacle over a range extending from one side wall to an opposite side wall.

5. The valve mechanism of claim 3 wherein:

said seat is slidably rotatable over a range through a vertical axis with respect to said orifice plate, said range encompassing the entire range through which said at least one fluid supply can pass unobstructed through said at least one arcuate slot in said orifice plate, said valve stem is pivotable within said valve stem housing in the x- and y- directions, and said valve stem is rotationally coupled to said valve stem housing; and said valve stem housing is slidably rotatable over a range through a vertical axis with respect to a base upon which said orifice plat is non-rotationally fixed.

6. The valve mechanism of claim 5 wherein said fluid supplies are a hot water supply and a cold water supply.

7. The valve mechanism of claim 5 wherein first surface of said disc is convex.

8. The valve mechanism of claim 5 further comprising a swiveling spray aerator fixture at said fluid outlet for both redirecting fluid flow within a receptacle with which said device is associated and providing an insulated location for a user to grasp said fluid outlet.

* * * * *